(No Model.)

R. M. HUNTER.
ELECTRIC RAILWAY.

No. 434,275. Patented Aug. 12, 1890.

Attest

Inventor

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRIC RAILWAY.

SPECIFICATION forming part of Letters Patent No. 434,275, dated August 12, 1890.

Original application filed July 14, 1885, Serial No. 171,625. Divided and this application filed September 11, 1889. Serial No. 323,598. (No model.)

*To all whom it may concern:*

Be it known that I, RUDOLPH M. HUNTER, of the city and county of Philadelphia and State of Pennsylvania, have invented an Improvement in Electric Railways, of which the following is a specification.

My invention has reference to electric railways; and it consists of certain improvements which are fully set forth in the following specification and shown in the accompanying drawings, which form a part thereof.

This application (Case 109) is a division of my application No. 171,625, filed July 14, 1885.

The object of my invention is to supply electric current, preferably from a common source, to two sets of line-conductors extending along the tracks of a railway or railways, and from said conductors deliver the current to the motors of electrically-propelled vehicles in multiple or parallel relation on the respective railways or tracks. The conductors may be separate from the rails, or may, if desired, constitute the rails. The electrically-propelled vehicles may be of any suitable construction, being provided with the necessary regulating mechanism, so as to be independently controlled.

Figure 1:
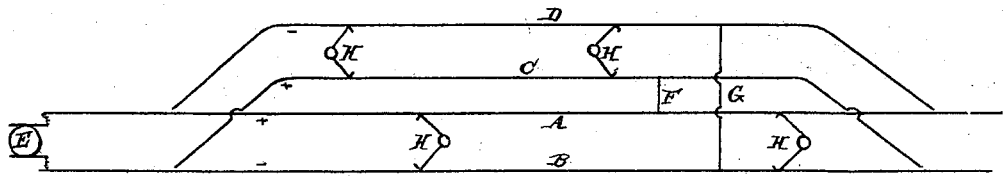
Figure 2:
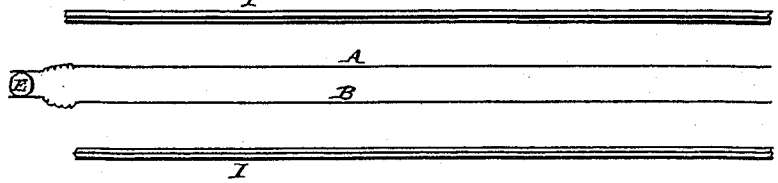
Figure 3:
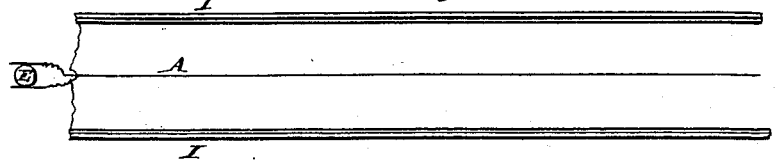
Figure 4:
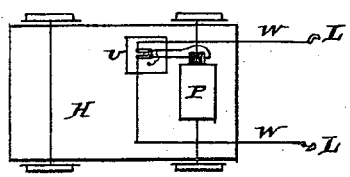

In the drawings, Figure 1 is a plan diagram illustrating my invention. Figs. 2 and 3 show plan views of two arrangements in which the rails form part of the circuits, and Fig. 4 is a plan view illustrating one of the electrically-propelled vehicles.

A B are the positive and negative conductors of one railway or track, and C D are the similar conductors of the other railway or track. The positive conductors A C are connected together by cross-wires F, and the negative conductors B D are also connected by cross-wires G. As shown, the electrically-propelled vehicles H may run from one track to the other, and there may be any desired number of such vehicles, the motors of which would be in multiple or parallel with each other. By the construction shown all the motors of the vehicles of each track or pair of conductors are in parallel. The current is supplied to the line-conductors by a dynamo-electric machine or generator E.

In Fig. 2 the conductors are shown as separate from the rails, while in Fig. 3 the rails are shown as the return-conductor. The vehicles H have a motor P for driving the axles and wheels, and carry a regulator U and motor-circuit W, terminating in collectors L, for making a traveling contact with the conductors of the railway. The regulator U has a current-reversing switch as part of its mechanism. This construction enables the easy regulation of all of the motors; and, furthermore, in large systems it enables a smaller generator to be used than would be otherwise necessary, because when some of the motors are slowing down and stopping the others are drawing upon the energy, and vice versa. When a large number of motors are coupled in parallel in this manner, a generator having a capacity equal to from one-half to three-fourths the total maximum capacity of the motors taken together is amply sufficient for the practical operation of the railway.

I do not confine myself to any particular details of construction, as the arrangement of the conductors and type of collectors may be greatly varied without departing from the spirit of my invention.

Having now described my invention, what I claim as new, and desire to secure by Letters Patent, is—

1. The combination of two railways or tracks, each having a positive and a negative conductor, electrical connections between the two positive conductors, electrical connections between the two negative conductors, a source of electric supply common to both sets of conductors and supplying current to the conductors, and electric motors upon each railway receiving current from the respective pairs of conductors and coupled in multiple or parallel with each other, whereby the current supplied to the motors is conveyed by the conductors with which the motors make connection and without the use of auxiliary conductors.

2. The combination of two pairs of electrical conductors extending along two separate tracks and receiving current from the same source, with electric motors upon each track receiving current from the conductors and coupled in parallel with each other, the current supplied to the conductors of one track being conveyed by the conductors of the other track.

3. The combination of two parallel tracks, each provided with a positive and a negative conductor, a common source of electric supply, connecting-circuits for coupling the similar conductors in parallel, and electric motors for each track receiving current from the conductors.

4. The combination of a series of electrically-propelled vehicles, circuits extending along two railway-tracks for supplying current to the motors on the vehicles and maintaining them in parallel, and traveling current-collecting devices between the motors and conductors.

5. The combination of a series of electrically-propelled vehicles, circuits extending along two railway-tracks for supplying current to the motors on the vehicles and maintaining them in parallel, a source of electricity common to all of said circuits, and traveling current-collecting devices between the motors and conductors.

6. The combination of a series of electrically-propelled vehicles, circuits extending along two railway-tracks for supplying current to the motors on the vehicles and maintaining them in parallel, traveling current-collecting devices between the motors and conductors, and regulating mechanism for controlling the motors carried by the vehicles without interfering with their parallel connection with the conductors.

7. The combination of two tracks adapted for the free passage of vehicles from one track to another, each having a positive and negative electric circuit, a source of electric supply, connections between the two positive circuits, connections between the two negative circuits, and electrically-propelled vehicles on each track having their motors coupled with the circuits in parallel.

In testimony of which invention I hereunto set my hand.

RUDOLPH M. HUNTER.

Witnesses:
ERNEST HOWARD HUNTER,
S. T. YERKES.